United States Patent
Liu et al.

(10) Patent No.: US 11,757,784 B2
(45) Date of Patent: Sep. 12, 2023

(54) PACKET PROCESSING METHOD AND SYSTEM, AND NETWORK DEVICE

(71) Applicant: HUAWEI TECHNOLOGIES CO., LTD., Shenzhen (CN)

(72) Inventors: Bing Liu, Beijing (CN); Sheng Jiang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 116 days.

(21) Appl. No.: 17/165,859

(22) Filed: Feb. 2, 2021

(65) Prior Publication Data

US 2021/0160188 A1 May 27, 2021

Related U.S. Application Data

(63) Continuation of application No. 15/933,318, filed on Mar. 22, 2018, now Pat. No. 10,931,590, which is a
(Continued)

(51) Int. Cl.
*H04L 47/32* (2022.01)
*H04W 84/18* (2009.01)
(Continued)

(52) U.S. Cl.
CPC .............. *H04L 47/32* (2013.01); *H04L 47/33* (2013.01); *H04L 63/0263* (2013.01);
(Continued)

(58) Field of Classification Search
None
See application file for complete search history.

(56) References Cited

U.S. PATENT DOCUMENTS

| 8,001,610 B1* | 8/2011 | Chickering | ............. | G06F 21/00 |
| | | | | 709/225 |
| 9,042,234 B1 | 5/2015 | Liljenstolpe et al. | | |

(Continued)

FOREIGN PATENT DOCUMENTS

| CN | 101005422 A | 7/2007 |
| CN | 101945432 A | 1/2011 |

(Continued)

OTHER PUBLICATIONS

B. Liu et al.,"Information Distribution over GRASP draft-liu-anima-grasp-distribution-01",Network Working Group, Sep. 23, 2016,total 8 pages.
(Continued)

*Primary Examiner* — Kodzovi Acolatse
(74) *Attorney, Agent, or Firm* — Maier & Maier, PLLC

(57) ABSTRACT

The present invention provides a packet processing method and system, and a network device. The method includes: receiving, by a first network device, a packet, where the packet includes match object information and match condition information; determining, by the first network device, a to-be-matched second network device according to the match object information, where the second network device includes one or more network devices; matching, by the first network device, device information of the second network device with the match condition information; and performing, by the first network device, forwarding processing or discarding processing on the packet according to a match result of matching the device information of the second network device with the match condition information. By using the method provided in the present invention, excessive occupation of network bandwidth can be reduced, and network resources can be saved.

18 Claims, 6 Drawing Sheets

Related U.S. Application Data continuation of application No. PCT/CN2015/090474, filed on Sep. 23, 2015.

(51) Int. Cl.
*H04W 40/02* (2009.01)
*H04L 47/33* (2022.01)
*H04L 9/40* (2022.01)
*H04W 76/14* (2018.01)

(52) U.S. Cl.
CPC ......... *H04W 40/023* (2013.01); *H04W 84/18* (2013.01); *H04W 76/14* (2018.02)

(56) References Cited

U.S. PATENT DOCUMENTS

| | | |
|---|---|---|
| 9,100,214 B1 | 8/2015 | Joseph |
| 2002/0080755 A1 | 6/2002 | Tasman et al. |
| 2003/0036970 A1* | 2/2003 | Brustoloni .............. H04L 67/61 705/26.1 |
| 2004/0018839 A1 | 1/2004 | Andric et al. |
| 2004/0090966 A1 | 5/2004 | Thomas |
| 2007/0129015 A1 | 6/2007 | Iwamoto et al. |
| 2009/0285197 A1 | 11/2009 | Chen et al. |
| 2010/0054183 A1* | 3/2010 | Shin .......... H04L 45/02 370/328 |
| 2010/0128305 A1* | 5/2010 | Kawata ................... H04L 69/16 358/1.15 |
| 2011/0310812 A1 | 12/2011 | Gage |
| 2011/0310864 A1 | 12/2011 | Gage |
| 2012/0177041 A1 | 7/2012 | Berman |
| 2012/0177042 A1 | 7/2012 | Berman |
| 2012/0218883 A1 | 8/2012 | Xu et al. |
| 2013/0148663 A1 | 6/2013 | Xiong |
| 2013/0176888 A1* | 7/2013 | Kubota ................... H04L 45/38 370/252 |
| 2014/0003425 A1 | 1/2014 | Zhao et al. |
| 2016/0135242 A1 | 5/2016 | Hampel et al. |
| 2017/0019804 A1* | 1/2017 | Morchon .............. H04W 24/02 |
| 2017/0150527 A1 | 5/2017 | Duval et al. |
| 2017/0339109 A1 | 11/2017 | Zeng et al. |

FOREIGN PATENT DOCUMENTS

| | | |
|---|---|---|
| CN | 102333031 A | 1/2012 |
| CN | 104333883 A | 2/2015 |
| CN | 104468781 A | 3/2015 |
| JP | 2010178211 A | 8/2010 |
| JP | 2013223191 A | 10/2013 |
| WO | 2005122482 A1 | 12/2005 |

OTHER PUBLICATIONS

M. Behringer et al.,"Automatic Networking—Definitions and Design Goals draft-irtf-nmrg-autonomic-network-definitions-04.txt",Internet Research Task Force,Apr. 6, 2015,total 15 pages.

M. Behringer, Ed. et al.,"A Reference Model for Autonomic Networking draft-behringer-anima-reerence-model-00", Internet-Draft,dated Apr. 20, 2015,total 9 pages.

B. Carpenter et al.,"A Generic Discovery and Negotiation Protocol for Autonomic Networking draft-carpenter-anima-gdn-protocol-00",Network Working Group,Apr. 16, 2015,total 37 pages.

RFC2328 J. Moy et al., "OSPF Version 2",Network Working Group,dated Apr. 1998,total 244 pages.

RFC5340 R. Coltun et al.,:OSPF for IPv6,dated Jul. 2008,total 94 pages.

B. Liu et al.,"Information Distribution over GRASP draft-liu-anima-grasp-distribution-03",Network Working Group,dated May 4, 2017,total 8 pages.

Supriyo Chatterjea, et al., "A Dynamic Data Aggregation Scheme for Wireless Sensor Networks", proceeding of the Program for Research on Integrated Systems and Circuits, Veldhoven, The Netherlands, on Jan. 1, 2013, XP055493776, 8 pages.

Ahmed et al. "RUFS: RobUst Forwarder Selection in Vehicular Content-Centric Networks." IEEE Communications Letters. vol. 19., No. 9. Sep. 2015. pp. 1616-1619.

* cited by examiner

PACKET PROCESSING METHOD AND SYSTEM, AND NETWORK DEVICE

CROSS-REFERENCE TO RELATED APPLICATIONS

This application is a continuation of U.S. patent application Ser. No. 15/933,318, filed on Mar. 22, 2018, which is a continuation of International Application No. PCT/CN2015/090474, filed on Sep. 23, 2015. All of the afore-mentioned patent applications are hereby incorporated by reference in their entireties.

TECHNICAL FIELD

The present invention relates to the field of communications technologies, and specifically, to a packet processing method and system, and a network device.

BACKGROUND

With development of network technologies, it is common that a network device forwards a packet in a flooding manner. For example, in an Intermediate System to Intermediate System (IS-IS) protocol network, each network device needs to create a link state packet (LSP) information base, and then the network device floods LSP information to all neighboring devices. For another example, the Internet Engineering Task Force currently proposes a concept of a self-organizing network technology. In a self-organizing network, a function of a conventional network management system may be automatically completed by means of interaction between network devices, so as to reduce network operation and maintenance costs on the whole. In the self-organizing network technology, a concept of intent is proposed. intent information may include one or more network policies. In an ideal intent information distribution mechanism, intent information can be entered on any network device, and then the network device automatically distributes the intent information to another network device. In an existing manner, for example, in the example of the self-organizing network technology, when distributing the intent information, a network device also distributes the intent information to another neighboring device in the network in a flooding manner. However, generally, not all devices in the network need to receive the flooded packet, and this distribution manner of flooding a packet in an entire network causes waste of network bandwidth resources.

SUMMARY

Embodiments of the present invention provide a packet processing method and system, and a network device, so as to resolve a prior-art technical problem that network bandwidth resources are wasted because a network device sends a packet to another device in a network in a flooding manner.

According to a first aspect, an embodiment of the present invention provides a packet processing method, including:

receiving, by a first network device, a packet, where the packet includes match object information and match condition information;

determining, by the first network device, a to-be-matched second network device according to the match object information, where the second network device includes one or more network devices;

matching, by the first network device, device information of the second network device with the match condition information; and performing, by the first network device, forwarding processing or discarding processing on the packet according to a match result of matching the device information of the second network device with the match condition information.

Optionally, the second network device is a neighboring device of the first network device, and correspondingly, the matching, by the first network device, device information of the second network device with the match condition information includes:

matching, by the first network device, device information of the neighboring device of the first network device with the match condition information.

Optionally, the second network device is the first network device, and correspondingly, the matching, by the first network device, device information of the second network device with the match condition information includes:

matching, by the first network device, device information of the first network device with the match condition information.

Optionally, the performing, by the first network device, forwarding processing on the packet according to a match result of matching the device information of the second network device with the match condition information includes:

when determining that a neighboring device that is of the first network device and that matches the match condition information exists, forwarding, by the first network device, the packet to the neighboring device that is of the first network device and that matches the match condition information.

Optionally, the performing, by the first network device, discarding processing on the packet according to a match result of matching the device information of the second network device with the match condition information includes:

when determining that no neighboring device that is of the first network device and that matches the match condition information exists, performing, by the first network device, discarding processing on the packet.

Optionally, the packet further includes action entry information; the action entry information includes: when the device information of the second network device matches the match condition information, a processing manner of the first network device for the packet is a processing manner of forwarding processing; and correspondingly, the performing, by the first network device, forwarding processing on the packet according to a match result of matching the device information of the second network device with the match condition information includes:

when determining that a neighboring device that is of the first network device and that matches the match condition information exists, forwarding, by the first network device according to the action entry information, the packet to the neighboring device that is of the first network device and that matches the match condition information.

Optionally, the packet further includes action entry information; the action entry information includes: when no second network device that matches the match condition information exists, a processing manner of the first network device for the packet is a processing manner of discarding processing; and correspondingly, the performing, by the first network device, discarding processing on the packet according to a match result of matching the device information of the second network device with the match condition information includes:

when determining that no neighboring device that is of the first network device and that matches the match condition information exists, performing, by the first network device, discarding processing on the packet according to the action entry information.

Optionally, the performing, by the first network device, forwarding processing on the packet according to a match result of matching the device information of the second network device with the match condition information includes:

when determining that the device information of the first network device matches the match condition information, forwarding, by the first network device, the packet to at least one neighboring device of the first network device.

Optionally, the performing, by the first network device, discarding processing on the packet according to a match result of matching the device information of the second network device with the match condition information includes:

when determining that the device information of the first network device does not match the match condition information, performing, by the first network device, discarding processing on the packet.

Optionally, the packet further includes action entry information; the action entry information includes: when the device information of the second network device matches the match condition information, a processing manner of the first network device for the packet is a processing manner of forwarding processing; and correspondingly, the performing, by the first network device, forwarding processing on the packet according to a match result of matching the device information of the second network device with the match condition information includes:

when determining that the device information of the first network device matches the match condition information, forwarding, by the first network device, the packet to at least one neighboring device of the first network device according to the action entry information.

Optionally, the packet further includes action entry information; the action entry information includes: when the device information of the second network device does not match the match condition information, a processing manner of the first network device for the packet is a processing manner of discarding processing; and correspondingly, the performing, by the first network device, discarding processing on the packet according to a match result of matching the device information of the second network device with the match condition information includes:

when determining that the device information of the first network device does not match the match condition information, performing, by the first network device, discarding processing on the packet according to the action entry information.

Optionally, the match condition information includes device role information; correspondingly, the device information of the second network device includes device role information of the second network device; and the matching, by the first network device, device information of the second network device with the match condition information includes:

matching, by the first network device, the device role information of the second network device with the match condition information.

Optionally, the match condition information includes protocol role information; correspondingly, the device information of the second network device includes protocol role information of the second network device; and the matching, by the first network device, device information of the second network device with the match condition information includes:

matching, by the first network device, the protocol role information of the second network device with the match condition information.

Optionally, the second network device is the first network device, the packet further includes intent information, the intent information includes network policy information, and the method further includes:

executing, by the first network device according to the intent information, a network policy corresponding to the network policy information.

Optionally, the match condition information includes at least two types of device information, the packet further includes an indication flag, the indication flag is used to instruct the first network device to select device information between which and the device information of the second network device matching is to be performed, and the selected device information is one or more of protocol role information, device role information, or device performance information.

Optionally, the packet further includes a first group of match information and a second group of match information, the first group of match information and the second group of match information each include match object information and match condition information, and correspondingly, the packet further includes a match indication flag, where the match indication flag is used to instruct the first network device to use the first group of match information and the second group of match information, or the match indication information is used to instruct to: when match condition information in at least two groups of match information is matched, select a processing manner corresponding to the matched match condition information to process the packet.

According to a second aspect, an embodiment of the present invention provides a first network device, including:

a receiving unit, configured to receive a packet, where the packet includes match object information and match condition information;

a determining unit, configured to determine a to-be-matched second network device according to the match object information, where the second network device includes one or more network devices;

a match unit, configured to match device information of the second network device with the match condition information; and a processing unit, configured to perform forwarding processing or discarding processing on the packet according to a match result of matching the device information of the second network device with the match condition information.

Optionally, the second network device is a neighboring device of the first network device, and correspondingly, that the match unit matches device information of the second network device with the match condition information includes:

matching device information of the neighboring device of the first network device with the match condition information.

Optionally, the second network device is the first network device, and correspondingly, that the match unit matches device information of the second network device with the match condition information includes:

matching device information of the first network device with the match condition information.

Optionally, that the processing unit performs forwarding processing on the packet according to a match result of matching the device information of the second network device with the match condition information includes:

when the match unit determines that a neighboring device that is of the first network device and that matches the match condition information exists, forwarding, by the processing unit, the packet to the neighboring device that is of the first network device and that matches the match condition information.

Optionally, the packet further includes action entry information; the action entry information includes: when the device information of the second network device matches the match condition information, a processing manner of the first network device for the packet is a processing manner of forwarding processing; and correspondingly, that the processing unit performs forwarding processing on the packet according to the match result from the match unit includes:

when the match unit determines that a neighboring device that is of the first network device and that matches the match condition information exists, forwarding the packet to the neighboring device that is of the first network device and that matches the match condition information.

Optionally, that the processing unit performs forwarding processing on the packet according to the match result includes:

when it is determined that the device information of the first network device matches the match condition information, forwarding, by the processing unit, the packet to at least one neighboring device of the first network device.

Optionally, the packet further includes action entry information; the action entry information includes: when the device information of the second network device matches the match condition information, a processing manner of the first network device for the packet is a processing manner of forwarding processing; and correspondingly, when the match unit determines that the device information of the first network device matches the match condition information, the processing unit forwards the packet to at least one neighboring device of the first network device according to the action entry information.

Optionally, the match condition information includes device role information; correspondingly, the device information of the second network device includes device role information of the second network device; and that the match unit matches device information of the second network device with the match condition information includes:

matching, by the first network device, the device role information of the second network device with the match condition information.

Optionally, the match condition information includes protocol role information; correspondingly, the device information of the second network device includes protocol role information of the second network device; and that the match unit matches device information of the second network device with the match condition information includes:

matching, by the first network device, the protocol role information of the second network device with the match condition information.

According to a third aspect, an embodiment of the present invention provides a network device, including:

an obtaining unit, configured to obtain match object information and match condition information;

a processing unit, configured to generate a packet, where the packet includes the match object information and the match condition information; and a sending unit, configured to send the packet to a first network device, so as to instruct the first network device to process the packet according to the match object information and the match condition information, where the match object information is used to instruct the first network device to determine a to-be-matched second network device according to the match object information, the second network device includes one or more network devices, the match condition information is used by the first network device to match device information of the to-be-matched second network device with the match condition information.

Optionally, the match object information is an identifier that is agreed on in advance between devices, and the identifier is used to identify that the to-be-matched second network device is a neighboring device of the first network device or the first network device.

Optionally, the match condition information includes device role information and device protocol information, the device role information is information for identifying a location of a device in a network, and the device role information is information for identifying a function of a device in a network.

According to a fourth aspect, an embodiment of the present invention provides a network device, including: a memory, a processor, and a network interface, where the memory, the processor, and the network interface are connected to each other by using a bus, the memory is configured to store a group of program instructions, and the processor is configured to invoke the program instruction stored in the memory to perform the following operations:

triggering the network interface to receive a packet, where the packet includes match object information and match condition information;

determining a to-be-matched second network device according to the match object information, where the second network device includes one or more network devices, and matching device information of the second network device with the match condition information; and performing forwarding processing or discarding processing on the packet according to a match result of matching the device information of the second network device with the match condition information.

Optionally, the second network device determined by the processor is the first network device, and correspondingly, that the processor matches device information of the second network device with the match condition information includes:

matching, by the processor, device information of the first network device with the match condition information.

Optionally, that the processor performs forwarding processing on the packet according to the match result includes:

when determining that a neighboring device that is of the first network device and that matches the match condition information exists, forwarding, by the processor, the packet to the neighboring device that is of the first network device and that matches the match condition information.

Optionally, that the processor performs discarding processing on the packet according to a match result of matching the device information of the second network device with the match condition information includes:

when determining that no neighboring device that is of the first network device and that matches the match condition information exists, performing, by the processor, discarding processing on the packet.

Optionally, that the processor performs forwarding processing on the packet according to the match result includes:

when determining that the device information of the first network device matches the match condition information, forwarding, by the processor, the packet to at least one neighboring device of the first network device.

Optionally, that the processor performs discarding processing on the packet according to the match result includes:

when determining that the device information of the first network device does not match the match condition information, performing, by the processor, discarding processing on the packet.

According to a fifth aspect, an embodiment of the present invention provides a packet processing system, and the system includes a first network device and a third network device, where the third network device is configured to: obtain match object information and match condition information; generate a packet that includes the match object information and the match condition information; and send the packet to the first network device, where the match object information is used to instruct the first network device to determine a network device corresponding to device information to be matched with the match condition information; and the first network device is configured to: receive the packet; determine a second network device corresponding to the match object information; match device information of the second network device with the match condition information; and perform forwarding processing or discarding processing on the packet according to action entry information and a match result of matching the device information of the second network device with the match condition information.

By using technical solutions provided in the embodiments of the present invention, after receiving a packet sent by another network device, the first network device needs to send the packet only to a specific device by using match object information and match condition information that are included in the packet, and does not need to flood the packet in an entire network. In this way, in an actual network, the match object information and the match condition information can be customized according to a network feature. Therefore, the packet is prevented from being flooded in the network without a purpose, so that excessive occupation of network bandwidth by packet forwarding can be reduced, and network resources can be saved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
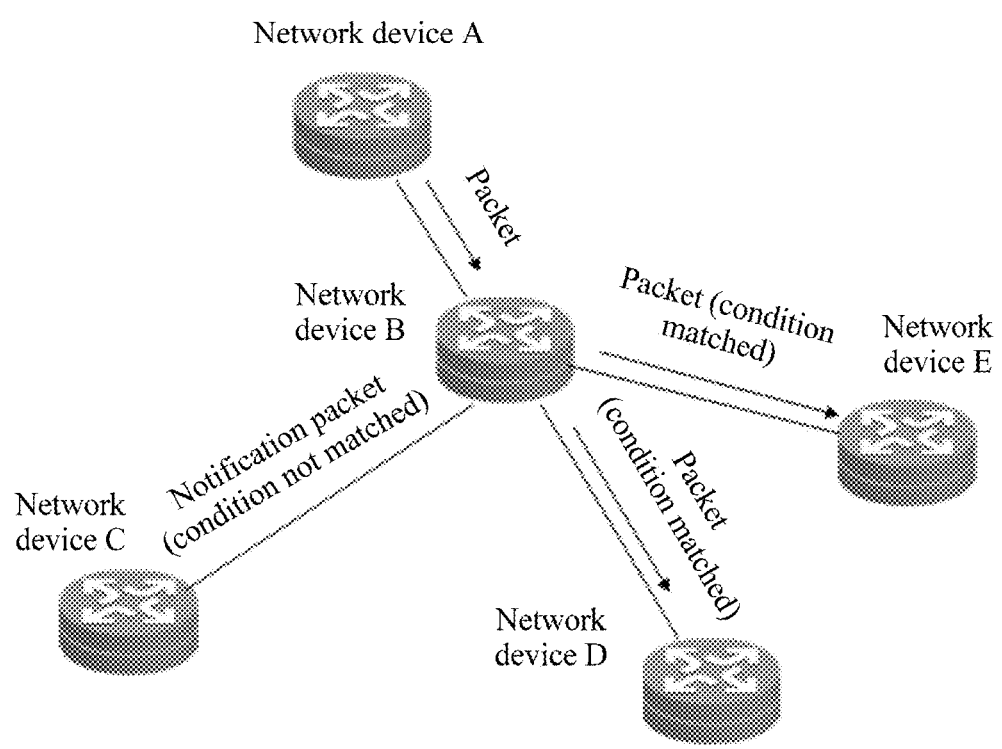
FIG. 1 is a schematic diagram of an application scenario of a packet processing method according to an embodiment of the present invention.

FIG. 1 is a schematic diagram of an application scenario of a packet processing method according to an embodiment of the present invention. In FIG. 1, a network device A, a network device C, a network device D, and a network device E are separately neighboring devices of a network device B. After obtaining a network policy, the network device A generates intent information according to the network policy. The network policy may be a network policy of setting a device to enter an energy saving mode, or a network policy of setting a network device to perform deep detection on a received packet, or the like. The network policy obtained by the network device A may be delivered by a network management system, or may be directly configured on the network device A by a user. The network device A generates a packet according to the generated intent information, and the packet includes match object information and match condition information. The network device A sends the packet to the network device B. The network device B determines, according to the match object information, a network device to be matched with the match condition information. The network device to be matched with the match condition information may be a neighboring device of the network device B, or may be the network device B.

After the network device B receives the packet, when learning, by using the match object information, that matching needs to be performed between device information of the neighboring device of the network device B and the match condition information, the network device B matches stored device information of the neighboring device with the match condition information. After the network device B determines a network device that matches the match condition information, the network device B sends the packet to the network device that matches the match condition information. After determining that there is no network device that matches the match condition information, the network device B performs discarding processing on the packet. For example, in FIG. 1, if device information of the network device D and device information of the network device E match the match condition information, the network device B sends the packet to the network device D and the network device E. If device information of the network device C does not match the match condition information, the network device B does not send the packet to the network device C. If none of device information of the network device C, the network device D, or the network device E matches the match condition information, the network device B performs discarding processing on the packet.

After the network device B receives the packet, when learning, by using the match object information, that matching needs to be performed between device information of the network device B and the match condition information, the network device B matches the device information of the network device B with the match condition information. After the network device B determines that the device information of the network device B matches the match condition information, the network device B sends the packet to the neighboring device of the network device B. In this case, provided that the device information of the network device B matches the match condition information, it is considered that the neighboring device of the network device B needs to receive the packet. For example, in FIG. 1, after the network device B receives the packet, when learning, by using the match object information, that matching needs to be performed between the device information of the network device B and the match condition information, the network device B matches the device information of the network device B with the match condition information. If the network device B determines that the device information of the network device B matches the match condition information, the network device B sends the packet to the neighbor of the network device B. That the network device B sends the packet to the neighboring device of the network device B may be sending the packet to all neighboring devices of the network device B or sending the packet to some neighboring devices of the network device B. No limitation is specifically imposed in this embodiment of the present invention. If the network device B determines that the device information of the network device B does not match the match condition information, the network device B performs discarding processing on the packet.

In a specific implementation, after receiving the packet, the network device B may execute a corresponding network policy according to the intent information included in the packet. The network policy executed by the network device B may be setting the network device B to enter an energy saving mode, or setting the network device B to perform deep detection on the received packet, or the like. That the network device B executes a corresponding network policy according to the intent information included in the packet may be performed before the network device B determines the network device to be matched with the match condition information, or may be performed after the network device B determines the network device to be matched with the match condition information.

In a specific implementation, the match object information may be an identifier that is agreed on in advance between devices or that is centrally configured by a network system. After receiving the packet, the network device B may learn, according to the identifier, whether matching needs to be performed between the device information of the neighboring device of the network device B and the match condition information, or matching needs to be performed between the device information of the network device B and the match condition information. For example, it is agreed between the network device A and the network device B that when a value of the identifier is 1, it indicates that the network device B needs to match the device information of the neighboring device of the network device B with the match condition; or when a value of the identifier is 0, it indicates that the network device B needs to match the device information of the network device B with the match condition.

In a specific implementation, the match condition information may include device role information or protocol role information. For example, in an IP-based radio access network (IP RAN), a device role may be a cell site gateway (CSG), an aggregation site gateway (Aggregation Site Gateway, ASG), a radio service gateway (RSG), or the like, and a protocol role may be a Generic Discovery and Negotiation Protocol (GDNP) counterpart (Counterpart), a Multiprotocol Label Switching (MPLS) label switching router (LSR), or the like. For example, in a network shown in FIG. 1, the network device E is a CSG in the IP RAN network, and the network device D is an ASG The network device B receives the packet sent by the network device A. The match condition information included in the packet is a device role CSC, and the match object information included in the packet indicates that matching needs to be performed between the match condition information and the device information of the neighboring device of the network device that receives the packet. When the network device B determines that matching needs to be performed between the device information of the neighboring device of the network device B and the match condition information, the network device B separately matches the match condition information with device role information of the network device E, the network device D, and the network device C. Because only the device role information of the network device E is the CSC, the network device B sends the packet only to the network device E.

By using the foregoing implementations, the network device B determines a to-be-matched network device according to the match object information included in the received packet, and then matches device information of the to-be-matched network device with the match condition information in the packet, so as to perform forwarding processing or discarding processing on the packet according to a match result. The network device B needs to send the packet only to a specific device, and does not need to flood the packet in a network. Therefore, the packet is prevented from being flooded in the network without a purpose, so that excessive occupation of network bandwidth can be reduced, and network resources can be saved.

Figure 2:
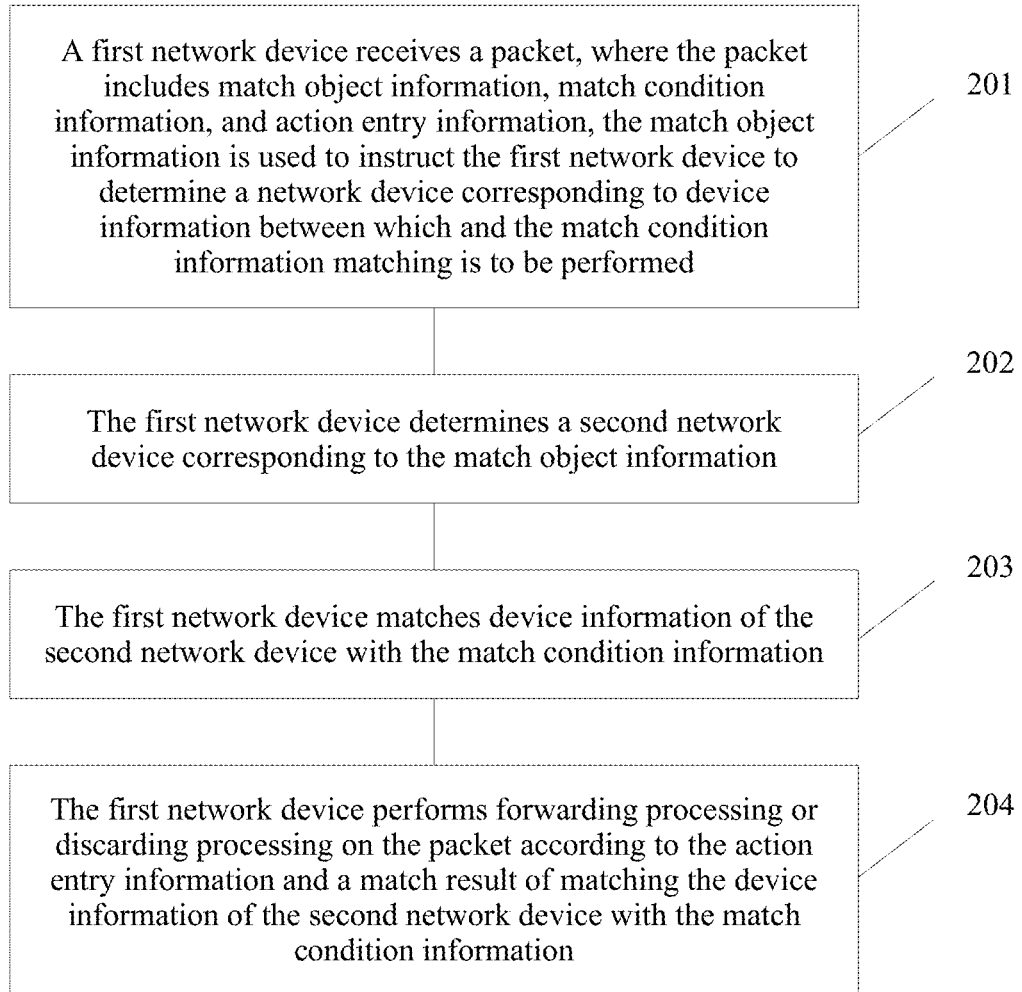
FIG. 2 is a schematic flowchart of a packet processing method according to an embodiment of the present invention.

Referring to FIG. 2, FIG. 2 is a schematic flowchart of a packet processing method according to an embodiment of the present invention. The method includes the following steps.

201. A first network device receives a packet, where the packet includes match object information and match condition information.

In a specific implementation, the match object information is used by the first network device to determine a to-be-matched second network device according to the match object information. The match condition information is used by the first network device to match device information of the to-be-matched second network device with the match condition information. The match condition information may include device information such as device role information, device protocol information, or device performance information.

202. The first network device determines a to-be-matched second network device according to the match object information, where the second network device includes one or more network devices.

In a specific implementation, the first network device may determine the to-be-matched second network device according to identifier information in the packet. The identifier information may be an identifier that is agreed on in advance between devices. For example, when a value of the identifier is 1, it indicates that matching needs to be performed between device information of a neighboring device of a network device B and the match condition; or when a value of the identifier is 0, it indicates that matching needs to be performed between device information of a network device B and the match condition.

203. The first network device matches device information of the second network device with the match condition information.

204. The first network device performs forwarding processing or discarding processing on the packet according to a match result of matching the device information of the second network device with the match condition information.

Further description is given in the following by using the network devices in FIG. 1 as an example. The first network device may be the network device B in the network shown in FIG. 1, and the packet may be the packet sent by the network device A to the network device B.

In this embodiment of the present invention, after receiving the packet, the first network device determines, according to the match object information, a network device to be matched with the match condition information, so as to determine a sending range of forwarding the packet. When the first network device determines, according to the match object information, that matching needs to be performed between device information of a neighboring device of the first network device and the match condition, the first network device matches stored device information of the neighboring device of the first network device with the match condition. Correspondingly, the second network device is a neighboring device of the first network device, and the matching, by the first network device, device information of the second network device with the match condition information includes:

matching, by the first network device, device information of the neighboring device of the first network device with the match condition information. Correspondingly, the performing, by the first network device, forwarding processing on the packet according to the match result includes:

when the first network device determines that device information matching the match condition information exists in the device information of the neighboring device of the first network device, forwarding, by the first network device, the packet to a neighboring device corresponding to the device information matching the match condition information, where the neighboring device of the first network device is a network device that establishes a communication connection to the first network device, and the neighboring device corresponding to the device information matching the match condition may be one or more neighboring devices; or when the first network device determines that no device information matching the match condition information exists in device information of all neighboring devices of the first network device, performing, by the first network device, discarding processing on the packet.

In a specific implementation, the device information of the neighboring device stored in the first network device may be obtained in advance by using a GDNP, or may be obtained from a network management device. The match object information includes identifier information. The identifier information is used to identify that the to-be-matched second network device is the first network device or a neighboring device of the first network device. The identifier information may be an identifier that is agreed on in advance between devices. For example, when a value of the identifier information is 1, it indicates that the first network device needs to match the device information of the neighboring device of the first network device with the match condition; or when a value of the identifier is 0, it indicates that the first network device needs to match device information of the first network device with the match condition. The device role information may be information for identifying a location of a device in a network, for example, a provider edge (PE) device or a customer edge (CE) device in a carrier network. The device role information may be information for identifying a function of a device in a network. For example, in an IP RAN network, a device role may be a CSG, an ASG, or an RSG.

In a specific implementation, when the first network device determines, according to the match object information, that matching needs to be performed between device information of the first network device and the match condition, the first network device matches the device information of the first network device with the match condition. In this case, the second network device is the first network device, and the matching, by the first network device, device information of the second network device with the match condition information includes:

matching, by the first network device, device information of the first network device with the match condition information. Correspondingly, the performing, by the first network device, forwarding processing on the packet according to the match result includes:

when the first network device determines that the device information of the first network device matches the match condition information, forwarding, by the first network device, the packet to a neighboring device of the first network device, where in a specific implementation, the packet may be forwarded to all neighboring devices, or may be forwarded to some neighboring devices or a signal neighboring device, and no limitation is specifically imposed in the present invention; or when the first network device determines that the device information of the first network device does not match the match condition information, performing, by the first network device, discarding processing on the packet.

In a specific implementation, the first network device configures in advance a processing manner that is of the first network device for the packet and that exists when matching succeeds, or a processing manner that is for the packet and that exists when matching succeeds is agreed on in advance between network devices. The processing manner may be performing forwarding processing on the packet when matching succeeds.

In a specific implementation, when the second network device is a neighboring device of the first network device, the packet may further include action entry information. The action entry information includes a processing manner that is of the first network device for the packet and that exists when device information matching the match condition information exists in the device information of the second network device. The processing manner may be a processing manner of performing forwarding processing on the packet. Correspondingly, the performing, by the first network device, forwarding processing on the packet according to a match result of matching the device information of the second network device with the match condition information includes:

when determining that a neighboring device that is of the first network device and that matches the match condition information exists, forwarding, by the first network device according to the action entry information, the packet to the neighboring device that is of the first network device and that matches the match condition information.

Alternatively, the action entry information may include: when no second network device that can match the match condition information exists, a processing manner of the first network device for the packet is a processing manner of discarding processing. Correspondingly, the performing, by the first network device, discarding processing on the packet according to a match result of matching the device information of the second network device with the match condition information includes:

when determining that no neighboring device that is of the first network device and that matches the match condition information exists, performing, by the first network device, discarding processing on the packet according to the action entry information.

In a specific implementation, when the second network device is the first network device, the packet further includes action entry information. The action entry information includes: when the device information of the second network device matches the match condition information, a processing manner of the first network device for the packet is a processing manner of forwarding processing. Correspondingly, the performing, by the first network device, forwarding processing on the packet according to a match result of matching the device information of the second network device with the match condition information includes:

when determining that the device information of the first network device matches the match condition information, forwarding, by the first network device, the packet to at least one neighboring device of the first network device according to the action entry information.

Alternatively, the action entry information may include: when the device information of the second network device does not match the match condition information, a processing manner of the first network device for the packet is a processing manner of discarding processing. Correspondingly, the performing, by the first network device, discarding processing on the packet according to a match result of matching the device information of the second network device with the match condition information includes:

when determining that the device information of the first network device does not match the match condition information, performing, by the first network device, discarding processing on the packet according to the action entry information.

In a specific implementation, the packet further includes intent information, the intent information includes network policy information, and the method further includes:

executing, by the first network device according to the intent information, a network policy corresponding to the network policy information. The network policy executed by the first network device may be setting the first network device to enter an energy saving mode, or setting the first network device to perform deep detection on the received packet, or the like. That the first network device executes a corresponding network policy according to the intent information included in the packet may be performed before the first network device determines the network device to be matched with the match condition information, or may be performed after the first network device determines the network device to be matched with the match condition information.

In a specific implementation, the match condition information includes device role information. After determining that the match condition information is the device role information, the first network device matches device role information of the second network device with the match condition. Correspondingly, the device information of the second network device includes the device role information of the second network device, and the matching, by the first network device, device information of the second network device with the match condition information includes:

matching, by the first network device, the device role information of the second network device with the match condition information.

In a specific implementation, the match condition information includes protocol role information. After determining that the match condition information is the protocol role information, the first network device matches protocol role information of the second network device with the match condition. Correspondingly, the device information of the second network device includes the protocol role information of the second network device, and the matching, by the first network device, device information of the second network device with the match condition information includes:

matching, by the first network device, the protocol role information of the second network device with the match condition information.

The protocol role information may be information for identifying a protocol function of a device in a network, for example, an LSR in an MPLS network or a label edge router (Label Edge Router, LER) in an MPLS network.

In a specific implementation, the match condition information may be performance information of a network device, for example, information about a forwarding capability or a capacity capability of a network device.

In a specific implementation, the match condition information may include at least two types of device information, for example, may include both protocol role information and device role information. In this case, only when the device information of the second network device matches the at least two types of device information in the match condition information or matches several specified types of specific device information, it is considered that matching succeeds. Alternatively, in another embodiment, the packet further includes an indication flag. The indication flag is used to instruct the first network device to select device information between which and the device information of the second network device matching is to be performed. The selected device information is one or more of protocol role information, device role information, or device performance information. The indication flag may be agreed on in advance between devices. For example, when a value of the indication flag is 1, it indicates that the first network device needs to match protocol role information in the match condition with protocol role information of the second network device; or when a value of the indication flag is 0, it indicates that the first network device needs to match device role information in the match condition with device role information of the second network device.

In a specific implementation, the packet may further include multiple groups of match information. Each group of match information includes match object information and match condition information. For example, the packet includes a first group of match information and a second group of match information. The first group of match information includes first match object information and first match condition information. The second group of match information includes second match object information and second match condition information. Correspondingly, the packet further includes a match indication flag. The match indication flag is used to instruct the first network device to use the first group of match information or the second group of match information. The match indication flag may be used to instruct the first network device to use the first group of match information or the second group of match information. Alternatively, the match indication information is used to instruct to: when match condition information in at least two groups of match information is matched, select a processing manner corresponding to the matched match condition information to process the packet.

By using the foregoing implementations, the first network device determines a to-be-matched network device by using the match object information included in the packet, and then matches device information of the to-be-matched network device with the match condition information in the packet, so as to perform forwarding processing or discarding processing on the packet according to a match result. The first network device needs to send the packet only to a specific device, and does not need to flood the packet in a network. Therefore, the packet is prevented from being flooded in the network without a purpose, so that excessive occupation of network bandwidth can be reduced, and network resources can be saved.

Figure 3:
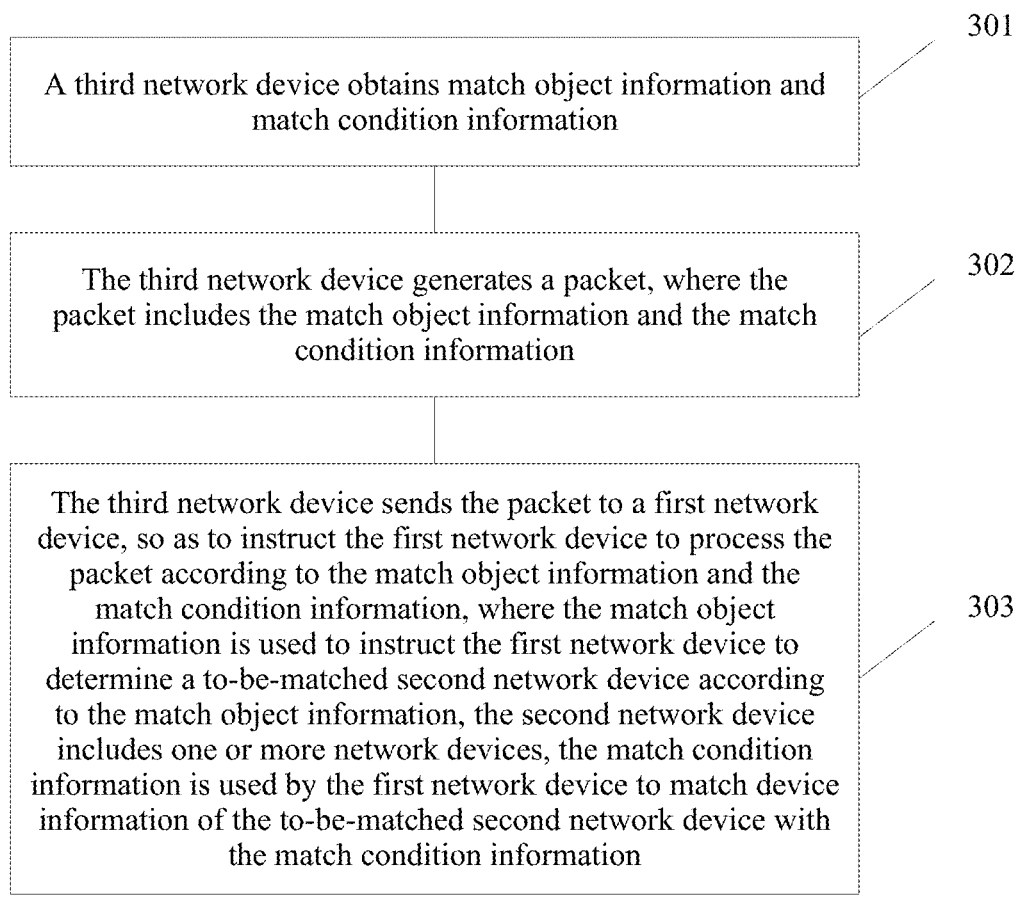
FIG. 3 is a schematic flowchart of a packet processing method according to an embodiment of the present invention.

Referring to FIG. 3, FIG. 3 is a schematic flowchart of a packet processing method according to an embodiment of the present invention. The method includes the following steps.

301. A third network device obtains match object information and match condition information.

302. The third network device generates a packet, where the packet includes the match object information and the match condition information.

303. The third network device sends the packet to a first network device, so as to instruct the first network device to process the packet according to the match object information and the match condition information.

In a specific implementation, the match object information is used by the first network device to determine a to-be-matched second network device according to the match object information. The match condition information is used by the first network device to match device information of the to-be-matched second network device with the match condition information. The match condition information may include device information such as device role information, device protocol information, or device performance information.

In a specific implementation, the third network device may determine corresponding match object information and match condition information according to a specific to-be-sent packet. For example, some packets need to be sent to a type of device, and some packets do not need to be sent to a type of network device. In this case, the third network device determines specific match object information and match condition information according to a packet.

In a specific implementation, the third network device may set the match object information and the match condition information according to a network feature. For example, in an MPLS network, if the third network device is an LSR, and the third network device wants to flood an MPLS packet to an LSR in the MPLS network by using the first network device, when a value of identifier information included in match object information included in the MPLS packet may be 1, it indicates that the first network device needs to match device information of a neighboring device of the first network device with the match condition. The match condition information is a protocol role LSR. In this way, after receiving the MPLS packet, the first network device matches the device information of the neighboring device of the first network device with the match condition, and sends the MPLS packet to a matched neighboring device. In this way, when the neighboring device of the first network device is an LSR, the neighboring device of the first network device can receive the MPLS packet. Further, an LSR that receives the MPLS packet continues to perform an action performed by the first network device, so that the MPLS packet can be flooded in the MPLS network with a purpose. Therefore, a prior-art technical problem that network bandwidth is excessively occupied because a packet is flooded in a network without a purpose is avoided.

In a specific implementation, the first network device may be the network device B in FIG. 1, and the third network device may be the network device A in FIG. 1. Alternatively, the first network device may be the first network device in the embodiment shown in FIG. 2, and the third network device may be a network device sending a packet to the first network device in the embodiment shown in FIG. 2.

For specific content of the match object information and the match condition information, refer to any one of the foregoing embodiments. Details are not described herein again.

In a specific implementation, the packet may further include action entry information. The action entry information includes a processing manner of the first network device for the packet. The processing manner may be a processing manner of forwarding processing or discarding processing.

In a specific implementation, the packet may further include intent information. The intent information includes network policy information. The first network device is further configured to execute a corresponding network policy according to the network policy information. In a specific implementation, the network policy information included in the intent information may be a network device energy saving policy. That the first network device executes a corresponding network policy according to the intent information is setting the first network device to enter an energy saving mode. That the first network device enters the energy saving mode may specifically include: the first network device disables an idle port, reduces a CPU frequency, or the like.

In this embodiment of the present invention, the third network device generates the packet that includes the match object information and the match condition information, and sends the packet to the first network device, so that the first network device can send the packet to a specific device according to the match object information and the match condition information, and does not need to send the packet to all devices in a network. Therefore, the packet is prevented from being flooded in the network without a purpose, so that excessive occupation of network bandwidth can be reduced, and network resources can be saved.

Figure 4:
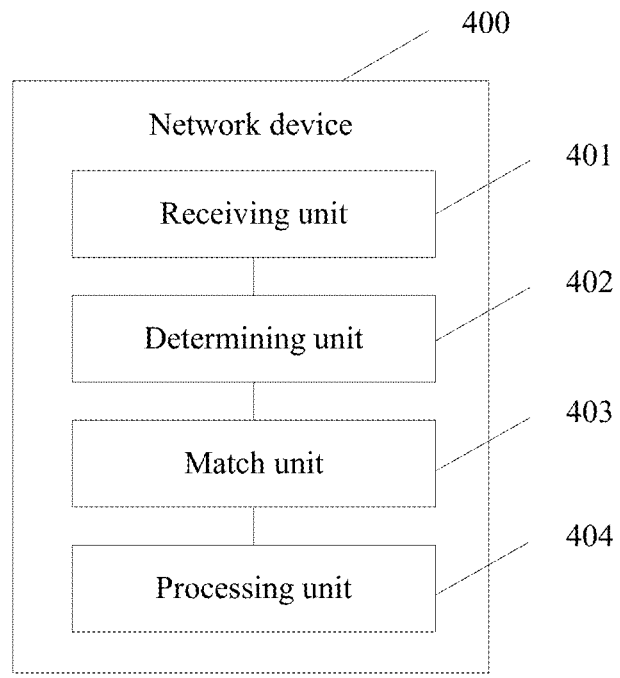
FIG. 4 is a schematic structural diagram of a network device according to an embodiment of the present invention.

Referring to FIG. 4, an embodiment of the present invention provides a network device 400. The network device 400 may be the network device B in FIG. 1, or may be the first network device in the embodiment shown in FIG. 2, or may be the first network device in the embodiment shown in FIG. 3. It may be understood that the network device 400 may include physical hardware necessary for performing the following processing, for example, a storage device and a processing device such as a general purpose central processing unit (CPU), a microprocessor, an application-specific integrated circuit (ASIC), or one or more integrated circuits. The network device 400 includes:

a receiving unit 401, configured to receive a packet, where the packet includes match object information and match condition information;

a determining unit 402, configured to determine a to-be-matched second network device according to the match object information, where the second network device includes one or more network devices;

a match unit 403, configured to match device information of the second network device determined by the determining unit 402 with the match condition information; and a processing unit 404, configured to perform forwarding processing or discarding processing on the packet according to a match result of matching the device information of the second network device with the match condition information.

In a specific implementation, the match object information is used by the network device 400 to determine a to-be-matched second network device according to the match object information. The match object information includes identifier information. The identifier information is used to identify that the to-be-matched second network device is the network device 400 or a neighboring device of the network device 400. The match condition information is used by the network device 400 to match the device information of the to-be-matched second network device with the match condition information. The match condition information may include device information such as device role information, device protocol information, or device performance information.

In a specific implementation, the determining unit 402 determines, according to the identifier information, that the to-be-matched second network device is the network device 400 or a neighboring device of the network device 400.

In a specific implementation, when the determining unit 402 determines, according to the match object information, that the to-be-matched second network device is a neighboring device of the network device 400, the network device 400 matches obtained device information of the neighboring device with the match condition. In this case, the second network device is a neighboring device of the network device 400. The network device 400 may obtain the device information of the neighboring device in advance by using a GDNP, and stores the device information of the neighboring device. Alternatively, the network device 400 may obtain the device information of the neighboring device in another manner, for example, periodically queries a network management device. Correspondingly, that the match unit 403 matches device information of the second network device with the match condition information may specifically include:

matching, by the match unit 403, device information of the neighboring device of the network device 400 with the match condition information.

Correspondingly, that the processing unit 404 performs forwarding processing on the packet according to the match result from the match unit 403 may specifically include:

when it is determined that device information matching the match condition information exists in the device information of the neighboring device of the network device 400, forwarding, by the processing unit 404, the packet to a neighboring device corresponding to the device information matching the match condition information, where the neighboring device corresponding to the device information matching the match condition may be one or more neighboring devices; or when the match unit 403 determines that no device information matching the match condition information exists in the device information of the neighboring device of the network device 400, performing, by the processing unit 404, discarding processing on the packet.

In a specific implementation, the network device 400 configures in advance a processing manner that is of the processing unit 404 for the packet and that exists when matching performed by the match unit 403 succeeds. The processing manner may be performing forwarding processing on the packet when matching performed by the match unit 403 succeeds.

In a specific implementation, the packet may further include action entry information. The action entry information includes a processing manner that is of the network device 400 for the packet and that exists when device information matching the match condition information exists in the device information of the second network device. The processing manner may be a processing manner of forwarding processing. Correspondingly, that the processing unit 404 performs forwarding processing on the packet according to the match result from the match unit 403 includes:

when the match unit 403 determines that a neighboring device that is of the first network device 400 and that matches the match condition information exists, forwarding, by the processing unit 404 according to the action entry information, the packet to the neighboring device that is of the first network device 400 and that matches the match condition information.

Alternatively, the action entry information includes a processing manner in which the network device 400 performs discarding processing on the packet when the device information of the second network device does not match the match condition information. Correspondingly, that the processing unit 404 performs discarding processing on the packet according to a match result of matching the device information of the second network device with the match condition information includes:

when the match unit 403 determines that no neighboring device that is of the first network device 400 and that matches the match condition information exists, performing, by the processing unit 404, discarding processing on the packet.

In a specific implementation, when the determining unit 402 determines, according to the match object information, that the to-be-matched second network device is the network device 400, the match unit 404 matches device information of the network device 400 with the match condition. In this case, the second network device is the network device 400. Correspondingly, that the match unit 403 matches device information of the second network device with the match condition information may specifically include:

matching, by the match unit 403, device information of the network device 400 with the match condition information.

Correspondingly, that the processing unit 404 performs forwarding processing on the packet according to the match result includes:

when it is determined that the device information of the network device 400 matches the match condition information, forwarding, by the processing unit 404, the packet to a neighboring device of the network device 400, where in a specific implementation, when the match unit 403 determines that the device information of the second network device matches the match condition information, the network device 400 may forward the packet to the neighboring device of the network device 400 according to action entry information; or when the match unit 403 determines that the device information of the first network device 400 does not match the match condition information, performing, by the processing unit 404, discarding processing on the packet.

The packet further includes action entry information. The action entry information includes: when the device information of the second network device matches the match condition information, a processing manner of the first network device 400 for the packet is a processing manner of forwarding processing. Correspondingly, that the processing unit 404 performs forwarding processing on the packet according to the match result from the match unit 403 includes:

when the match unit 403 determines that the device information of the first network device 400 matches the match condition information, forwarding, by the processing unit 404, the packet to at least one neighboring device of the first network device 400 according to the action entry information.

Alternatively, the action entry information includes: when the device information of the second network device does not match the match condition information, a processing manner of the first network device 400 for the packet is a processing manner of discarding processing. Correspondingly, that the processing unit 404 performs discarding processing on the packet according to the match result from the match unit 403 includes:

when the match unit 403 determines that the device information of the first network device 400 does not match the match condition information, performing, by the processing unit 404, discarding processing on the packet according to the action entry information.

In a specific implementation, the packet further includes intent information. The intent information includes network policy information. The processing unit 404 is further configured to execute a corresponding network policy according to the intent information. The network policy information included in the intent information may be a network device energy saving policy. That the processing unit 404 executes a corresponding network policy according to the intent information is setting the network device 400 to enter an energy saving mode. That the network device 400 enters the energy saving mode may specifically include: the network device 400 disables an idle port, reduces a CPU frequency, or the like. The processing unit 404 may execute the corresponding network policy according to the intent information after the receiving unit 401 receives the packet or before the match unit 403 performs a match action. Alternatively, the processing unit 404 may execute the corresponding network policy according to the intent information after processing the packet according to the match result from the match unit 403.

In a specific implementation, the match condition information may be device role information. Correspondingly, the device information of the second network device includes device role information of the second network device, and that the match unit 403 matches device information of the second network device with the match condition information specifically includes:

matching, by the match unit 403, the device role information of the second network device with the match condition information.

The device role information may be information for identifying a location of a device in a network, for example, a PE device or a CE device in a carrier network. For example, when a device role of the second network device is a PE device in the carrier network, and the device role information included in the match condition information is also a PE device in the carrier network, the match unit 403 may determine that the second network device is a network device meeting the match condition information.

The device role information may be information for identifying a function of a device in a network. For example, in an IP RAN network, a device role may be a CSG; an ASG or an RSG For example, when the device role information of the second network device is a CSG device in the IP RAN network, and the device role information included in the match condition information is represented as a CSG device in the IP RAN network, the match unit 403 may determine that the second network device is a network device meeting the match condition information.

In another specific implementation, the match condition information may be protocol role information. Correspondingly, the device information of the second network device includes protocol role information of the second network device, and that the match unit 403 matches device information of the second network device with the match condition information includes:

matching, by the match unit 403, the protocol role information of the second network device with the match condition information.

The protocol role information may be information for identifying a protocol function of a device in a specific protocol network, for example, an LSR in an MPLS network or an LER in an MPLS network. For example, when a device protocol role of the second network device is an LSR, and the protocol role information included in the match condition information is also the LSR, the match unit 403 may determine that the second network device is a network device meeting the match condition information.

In a specific implementation, for specific content of the match object information and the match condition information, refer to any one of the foregoing embodiments. Details are not described herein again.

It may be understood that the determining unit 402, the match unit 403, and the processing unit 404 may be implemented by using hardware, firmware, software, or a combination thereof. In an actual application, a specific implementation is determined according to a product design requirement or manufacturing costs. The present invention should not be limited to a specific implementation.

The network device 400 provided in this embodiment of the present invention determines a to-be-matched network device by using the match object information included in the packet, and then matches device information of the to-be-matched network device with the match condition information in the packet, so as to forward or discard the packet according to a match result. The network device 400 needs to send the packet only to a specific device, and does not need to flood the packet in a network. Therefore, the packet is prevented from being flooded in the network without a purpose, so that excessive occupation of network bandwidth can be reduced, and network resources can be saved.

Figure 5:
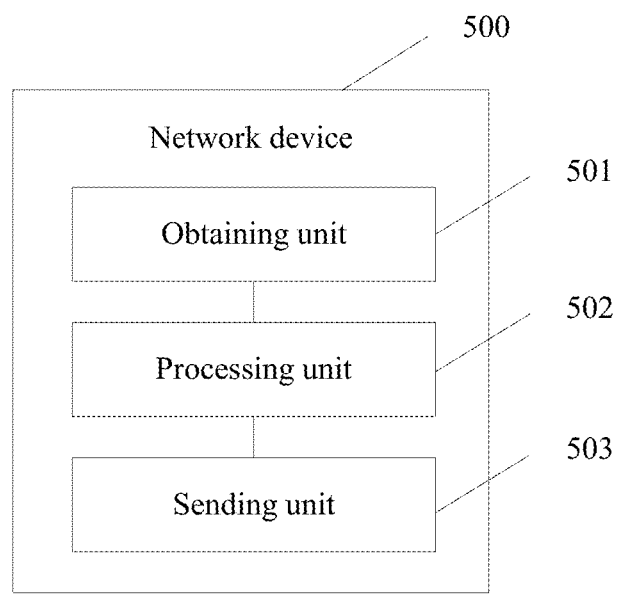
FIG. 5 is a schematic structural diagram of a network device according to an embodiment of the present invention.

Referring to FIG. 5, an embodiment of the present invention provides a network device 500. The network device 500 may be the network device A in FIG. 1, or may be a network device sending a packet to the first network device in the embodiment shown in FIG. 2, or may be the third network device in the embodiment shown in FIG. 3. The network device 500 includes:

an obtaining unit 501, configured to obtain match object information and match condition information;

a processing unit 502, configured to generate a packet, where the packet includes the match object information and the match condition information; and a sending unit 503, configured to send the packet to a first network device, so as to instruct the first network device to process the packet according to the match object information and the match condition information, where the match object information is used to instruct the first network device to determine a to-be-matched second network device according to the match object information, and the second network device includes one or more network devices.

The match condition information is used by the first network device to match device information of the to-be-matched second network device with the match condition information. The match condition information may include device information such as device role information, device protocol information, or device performance information.

In a specific implementation, the network device 500 may determine corresponding match object information and match condition information according to a specific to-be-sent packet. For example, some packets need to be sent to a type of device, and some packets do not need to be sent to a type of network device. In this case, the network device 500 determines specific match object information and match condition information according to a packet.

In a specific implementation, the network device 500 may set the match object information and the match condition information according to a network feature. For example, in an MPLS network, if the network device 500 is an LSR, and the network device 500 wants to flood an MPLS packet to an LSR in the MPLS network by using the first network device, when a value of identifier information included in match object information included in the MPLS packet may be 1, it indicates that the first network device needs to match device information of a neighboring device of the first network device with the match condition. The match condition information is a protocol role LSR. In this way, after receiving the MPLS packet, the first network device matches the device information of the neighboring device of the first network device with the match condition, and sends the MPLS packet to a matched neighboring device. In this way, when the neighboring device of the first network device is an LSR, the neighboring device of the first network device can receive the MPLS packet. Further, an LSR that receives the MPLS packet continues to perform an action performed by the first network device, so that the MPLS packet can be flooded in the MPLS network with a purpose. Therefore, a prior-art technical problem that network bandwidth is excessively occupied because a packet is flooded in a network without a purpose is avoided.

In a specific embodiment, for specific content of the match object information and the match condition information, refer to any one of the foregoing embodiments. Details are not described herein again.

In a specific implementation, the packet may further include action entry information. The action entry information includes a processing manner of the first network device for the packet. The processing manner may be a processing manner of forwarding processing or discarding processing.

In a specific implementation, the packet may further include intent information. The intent information includes network policy information. The first network device is further configured to execute a corresponding network policy according to the intent information. In a specific implementation, the network policy information included in the intent information may be a network device energy saving policy. That the first network device executes a corresponding network policy according to the intent information is setting the first network device to enter an energy saving mode. That the first network device enters the energy saving mode may specifically include: the first network device disables an idle port, reduces a CPU frequency, or the like.

In this embodiment of the present invention, the network device 500 generates the packet that includes the match object information and the match condition information, and sends the packet to the first network device, so that the first network device can send the packet to a specific device according to the match object information and the match condition information, and does not need to send the packet to all devices in a network. Therefore, the packet is prevented from being flooded in the network without a purpose, so that excessive occupation of network bandwidth can be reduced, and network resources can be saved.

Figure 6:
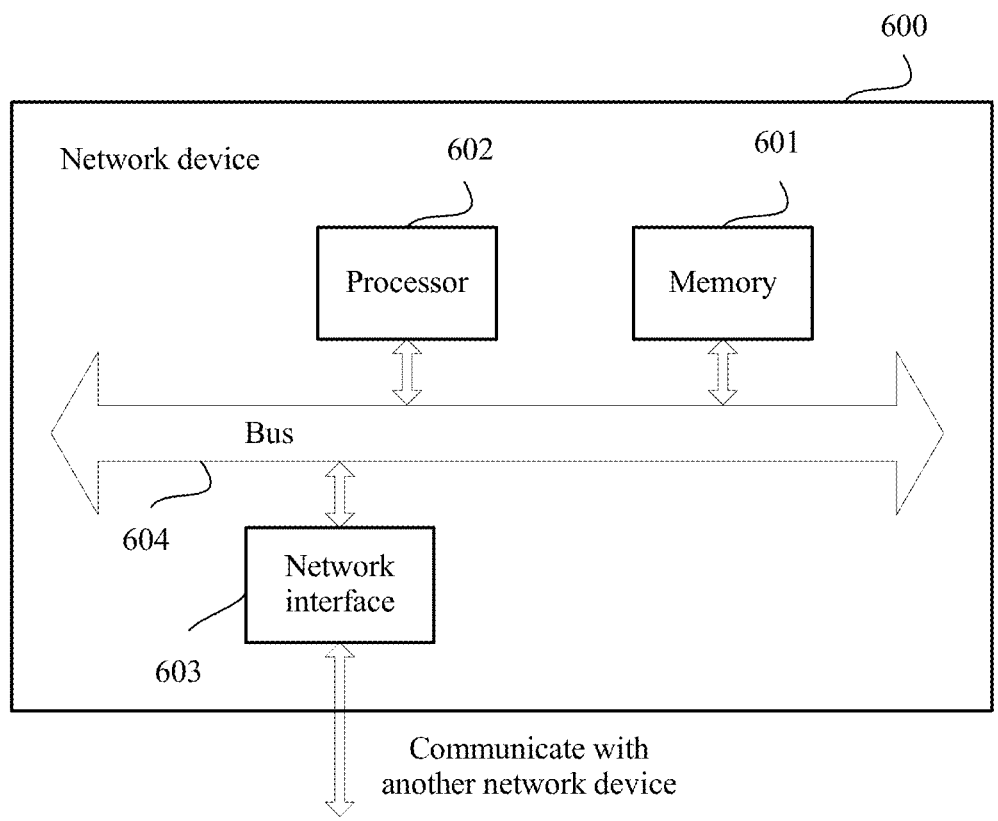
FIG. 6 is a schematic structural diagram of a network device according to an embodiment of the present invention.

Referring to FIG. 6, an embodiment of the present invention provides a network device 600. The network device 600 may be the network device B in FIG. 1, or may be the first network device in the embodiment shown in FIG. 2, or may be the first network device in the embodiment shown in FIG. 3. The network device 600 includes a memory 601, a processor 602, and a network interface 603. The memory 601, the processor 602, and the network interface 603 are connected to each other by using a bus 604. The memory 601 is configured to store a group of program instructions, and the processor 602 is configured to invoke the program instruction stored in the memory 601 to perform the following operations:

triggering the network interface 603 to receive a packet, where the packet includes match object information and match condition information;

determining a to-be-matched second network device according to the match object information, where the second network device includes one or more network devices, and matching device information of the second network device with the match condition information; and performing forwarding processing or discarding processing on the packet according to a match result of matching the device information of the second network device with the match condition information.

In a specific embodiment, for specific content of the match object information and the match condition information, refer to any one of the foregoing embodiments. Details are not described herein again.

In a specific embodiment, when the processor 602 determines, according to the match object information, that the to-be-matched second network device is a neighboring device of the network device 600, the network device 600 matches obtained device information of the neighboring device with the match condition. Correspondingly, the second network device is a neighboring device of the network device 600, and that the processor 602 matches device information of the second network device with the match condition information includes:

matching, by the processor 602, device information of the neighboring device of the network device 600 with the match condition information. Correspondingly, that the processor 602 performs forwarding processing on the packet according to the match result includes:

when determining that device information matching the match condition information exists in the device information of the neighboring device of the network device 600, forwarding, by the processor 602, the packet to a neighboring device corresponding to the device information matching the match condition information, where the neighboring device corresponding to the device information matching the match condition may be one or more neighboring devices; or when the processor 602 determines that no device information matching the match condition information exists in the device information of the neighboring device of the network device 600, performing, by the processor 602, discarding processing on the packet.

The packet may further include action entry information. The action entry information includes a processing manner that is of the network device 600 for the packet and that exists when device information matching the match condition information exists in the device information of the second network device. The processing manner may be a processing manner of forwarding processing. Correspondingly, that the processor 602 performs forwarding processing on the packet according to a match result of matching the device information of the second network device with the match condition information includes:

when determining that a neighboring device that is of the first network device 600 and that matches the match condition information exists, forwarding, by the processor 602 according to the action entry information, the packet to the neighboring device that is of the network device 600 and that matches the match condition information.

Alternatively, the action entry information includes a processing manner in which the network device 600 performs discarding processing on the packet when the device information of the second network device does not match the match condition information. Correspondingly, that the processor 602 performs discarding processing on the packet according to a match result of matching the device information of the second network device with the match condition information includes:

when determining that no neighboring device that is of the network device 600 and that matches the match condition information, performing, by the processor 602, discarding processing on the packet.

In a specific implementation, when the processor 602 determines, according to the match object information, that the to-be-matched second network device is the network device 600, the network device 600 matches device information of the network device 600 with the match condition. Correspondingly, the second network device is the network device 600, and that the processor 602 matches device information of the second network device with the match condition information includes:

matching, by the processor 602, device information of the network device 600 with the match condition information. Correspondingly, that the processor 602 performs forwarding processing on the packet according to the match result includes:

when the processor 602 determines that the device information of the network device 600 matches the match condition information, sending, by the network interface 603, the packet to all neighboring devices of the network device 600; or when the processor 602 determines that the device information of the network device 600 does not match the match condition information, performing, by the processor 602, discarding processing on the packet.

The packet further includes action entry information. The action entry information includes: when the device information of the second network device matches the match condition information, a processing manner of the network device 600 for the packet is a processing manner of forwarding processing. Correspondingly, that the processor 602 performs forwarding processing on the packet according to a match result of matching the device information of the second network device with the match condition information includes:

when determining that the device information of the network device 600 matches the match condition information, forwarding, by the processor 602, the packet to at least one neighboring device of the network device 600 according to the action entry information.

Alternatively, the action entry information includes: when the device information of the second network device does not match the match condition information, a processing manner of the network device 600 for the packet is a processing manner of discarding processing. Correspondingly, that the processor 602 performs discarding processing on the packet according to a match result of matching the device information of the second network device with the match condition information includes:

when determining that the device information of the network device 600 does not match the match condition information, performing, by the processor 602, discarding processing on the packet according to the action entry information.

In a specific implementation, the packet further includes intent information. The intent information includes network policy information. The processor 602 is further configured to execute a corresponding network policy according to the intent information. The network policy information included in the intent information may be a network device energy saving policy. That the processor 602 executes a corresponding network policy according to the intent information is setting the network device 600 to enter an energy saving mode.

The match condition information may include device role information. Correspondingly, the device information of the second network device includes device role information of the second network device, and that the processor 602 matches device information of the second network device with the match condition information includes:

matching, by the processor 602, the device role information of the second network device with the match condition information.

In another specific implementation, the match condition information may be protocol role information. Correspondingly, the device information of the second network device includes protocol role information of the second network device, and that the processor 602 matches device information of the second network device with the match condition information includes:

matching, by the processor 602, the protocol role information of the second network device with the match condition information.

For specific content of the device role information and the protocol role information, refer to any one of the foregoing embodiments. Details are not described herein again.

The network device 600 provided in this embodiment of the present invention determines a to-be-matched network device by using the match object information included in the packet, and then matches device information of the to-be-matched network device with the match condition information in the packet, so as to perform forwarding processing or discarding processing on the packet according to a match result. The network device 600 needs to send the packet only to a specific device, and does not need to flood the packet in a network. Therefore, the packet is prevented from being flooded in the network without a purpose, so that excessive occupation of network bandwidth can be reduced, and network resources can be saved.

Figure 7:
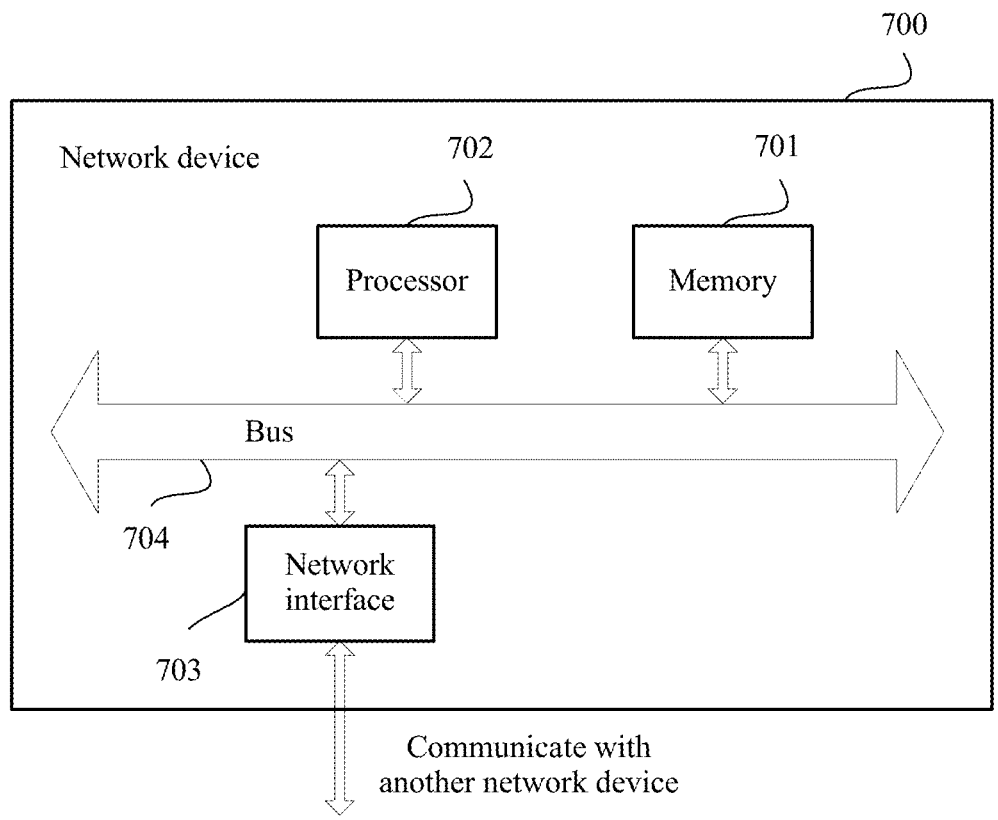
FIG. 7 is a schematic structural diagram of a network device according to an embodiment of the present invention.

Referring to FIG. 7, an embodiment of the present invention provides a network device 700. The network device 700 may be the network device A in FIG. 1, or may be a network device sending a packet to the first network device in the embodiment shown in FIG. 2, or may be the third network device in the embodiment shown in FIG. 3. The network device 700 includes a memory 701, a processor 702, and a network interface 703. The memory 701, the processor 702, and the network interface 703 are connected to each other by using a bus 704. The memory 701 is configured to store a group of program instructions, and the processor 702 is configured to invoke the program instruction stored in the memory 701 to perform the following operations:

obtaining match object information and match condition information;

generating a packet, where the packet includes the match object information and the match condition information; and sending the packet to a first network device, so as to instruct the first network device to process the packet according to the match object information and the match condition information, where the match object information is used to instruct the first network device to determine a to-be-matched second network device according to the match object information, and the second network device includes one or more network devices.

The match object information is used by the first network device to determine a to-be-matched second network device according to the match object information. The match condition information is used by the first network device to match device information of the to-be-matched second network device with the match condition information. The match condition information includes device role information or device protocol information.

In a specific embodiment, for specific content of the match object information and the match condition information, refer to any one of the foregoing embodiments. Details are not described herein again.

In a specific implementation, the packet may further include intent information. The intent information includes network policy information. The first network device is further configured to execute a corresponding network policy according to the intent information. In a specific implementation, the network policy information included in the intent information may be a network device energy saving policy. That the first network device executes a corresponding network policy according to the intent information is setting the first network device to enter an energy saving mode. That the first network device enters the energy saving mode may specifically include: the first network device disables an idle port, reduces a CPU frequency, or the like.

In this embodiment of the present invention, the network device 700 generates the packet that includes the match object information and the match condition information, and sends the packet to the first network device, so that the first network device can send the packet to a specific device according to the match object information and the match condition information, and does not need to send the packet to all devices in a network. Therefore, the packet is prevented from being flooded in the network without a purpose, so that excessive occupation of network bandwidth can be reduced, and network resources can be saved.

Figure 8:
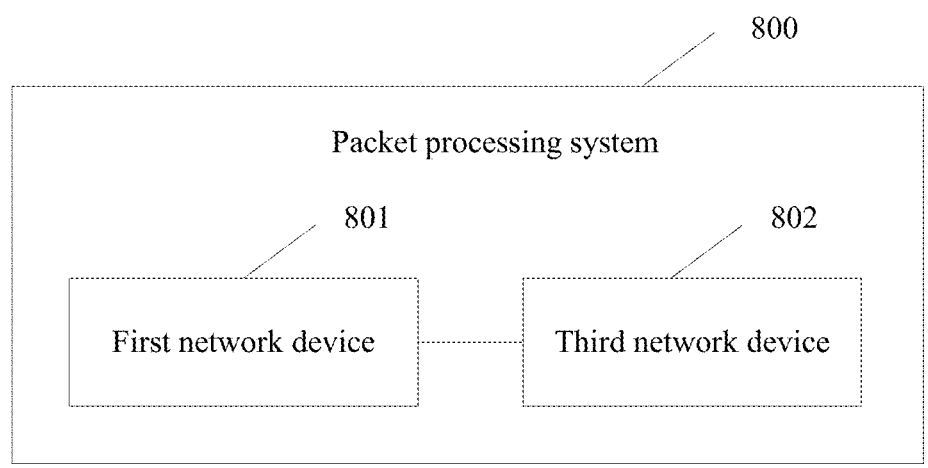
FIG. 8 is a schematic diagram of a packet processing system according to an embodiment of the present invention.

Referring to FIG. 8, an embodiment of the present invention provides a packet processing system 800. The packet processing system includes a first network device 801 and a third network device 802.

The third network device 802 is configured to: obtain match object information and match condition information; generate a packet that includes the match object information and the match condition information; and send the packet to the first network device 801, where the match object information is used to instruct the first network device 801 to determine a network device corresponding to device information to be matched with the match condition information.

The first network device 801 is configured to: receive the packet; determine a second network device corresponding to the match object information; match device information of the second network device with the match condition information; and perform forwarding processing or discarding processing on the packet according to action entry information and a match result of matching the device information of the second network device with the match condition information.

In a specific embodiment, the first network device 801 may be the network device B in FIG. 1, and the third network device 802 may be the network device A in FIG. 1. The first network device 801 may be the first network device in the embodiment shown in FIG. 2. The first network device 801 may be the first network device in the embodiment shown FIG. 3, and the third network device 802 may be the third network device in the embodiment shown in FIG. 3. The first network device 801 may be the network device 400 in the embodiment shown FIG. 4, or the first network device 801 may be the network device 600 in the embodiment shown in FIG. 6. For specific content related to the first network device 801, refer to any one of the foregoing embodiments. Details are not described herein again. The third network device 802 may be the network device 500 in the embodiment shown FIG. 5, or the third network device 802 may be the network device 700 in the embodiment shown in FIG. 7. For specific content related to the third network device 802, refer to any one of the foregoing embodiments. Details are not described herein again.

In the packet processing system 800 in this embodiment of the present invention, the third network device 802 generates the packet that includes the match object information and the match condition information, and sends the packet to the first network device 801; and the first network device 801 determines a to-be-matched network device by using the match object information included in the packet, and then matches device information of the to-be-matched network device with the match condition information in the packet, so as to perform forwarding processing or discarding processing on the packet according to a match result. The first network device 801 needs to send the packet only to a specific device, and does not need to flood the packet in a network. Therefore, the packet is prevented from being flooded in the network without a purpose, so that excessive occupation of network bandwidth can be reduced, and network resources can be saved.

In the embodiments of the present invention, "first" in the mentioned first network device or first group of match information is only used as a name identifier, and does not mean being the first in a sequence. This rule is also applicable to "second" or "third".

Persons of ordinary skill in the art may understand that all or some of the steps of the method embodiments may be implemented by a program instructing relevant hardware. The program may be stored in a computer readable storage medium. When the program runs, the steps of the method embodiments are performed. The storage medium includes: any medium that can store program code, such as a ROM, a RAM, a magnetic disk, or an optical disc.

Finally, it should be noted that the foregoing embodiments are only intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A packet processing method, comprising:
   receiving, by a first network device, a packet, wherein the packet comprises match object information and match condition information;
   determining, by the first network device, a to-be-matched second network device among one or more network devices according to the match object information;
   matching, by the first network device, device information of the second network device with the match condition information, wherein the device information of the second network device matches device performance information of the first network device and the device performance information is either information about a forwarding capability or a capacity capability of a network device; and
   performing, by the first network device, forwarding processing or discarding processing on the packet according to a match result of matching the device information of the second network device with the match condition information.

2. The method according to claim 1, wherein the second network device is a neighboring device of the first network device, and correspondingly, the matching, by the first network device, the device information of the second network device with the match condition information further comprises:
   matching, by the first network device, device information of the neighboring device of the first network device with the match condition information.

3. The method according to claim 2, wherein performing, by the first network device, the forwarding processing on the packet according to the match result of matching the device information of the second network device with the match condition information further comprises:
   when determining that a neighboring device that is of the first network device and that matches the match condition information exists, forwarding, by the first network device, the packet to the neighboring device that is of the first network device and that matches the match condition information; and
   wherein performing, by the first network device, the discarding processing on the packet according to the match result of matching the device information of the second network device with the match condition information further comprises:
   when determining that no neighboring device that is of the first network device and that matches the match condition information exists, performing, by the first network device, discarding processing on the packet.

4. The method according to claim 2, wherein the packet further comprises action entry information and:
   when the device information of the second network device matches the match condition information, a processing manner of the first network device for the packet is a processing manner of forwarding processing; and correspondingly, performing, by the first network device, the forwarding processing on the packet according to the match result of matching the device information of the second network device with the match condition information further comprises:
   when determining that a neighboring device that is of the first network device and that matches the match condition information exists, forwarding, by the first network device according to the action entry information, the packet to the neighboring device that is of the first network device and that matches the match condition information; and
   when no second network device that matches the match condition information exists, a processing manner of the first network device for the packet is a processing manner of discarding processing; and correspondingly, performing, by the first network device, the discarding processing on the packet according to the match result of matching the device information of the second network device with the match condition information further comprises:
   when determining that no neighboring device that is of the first network device and that matches the match condition information exists, performing, by the first network device, discarding processing on the packet according to the action entry information.

5. The method according to claim 1, wherein the second network device is the first network device, and correspondingly, the matching, by the first network device, the device information of the second network device with the match condition information further comprises:
   matching, by the first network device, device information of the first network device with the match condition information.

6. The method according to claim 5, wherein performing, by the first network device, the forwarding processing on the packet according to the match result of matching the device information of the second network device with the match condition information further comprises:
   when determining that the device information of the first network device matches the match condition information, forwarding, by the first network device, the packet to at least one neighboring device of the first network device.

7. The method according to claim 5, wherein performing, by the first network device, the discarding processing on the packet according to the match result of matching the device information of the second network device with the match condition information further comprises:
   when determining that the device information of the first network device does not match the match condition information, performing, by the first network device, the discarding processing on the packet.

8. The method according to claim 5, wherein the packet further comprises action entry information and
   when the device information of the second network device matches the match condition information, a processing manner of the first network device for the packet is a processing manner of forwarding processing; and correspondingly, performing, by the first network device, the forwarding processing on the packet according to the match result of matching the device information of the second network device with the match condition information further comprises:
when determining that the device information of the first network device matches the match condition information, forwarding, by the first network device, the packet to at least one neighboring device of the first network device according to the action entry information; and
when the device information of the second network device does not match the match condition information, a processing manner of the first network device for the packet is a processing manner of discarding processing; and correspondingly, performing, by the first network device, the discarding processing on the packet according to the match result of matching the device information of the second network device with the match condition information further comprises:
when determining that the device information of the first network device does not match the match condition information, performing, by the first network device, discarding processing on the packet according to the action entry information.

9. The method according to claim 1, wherein the packet further comprises intent information, the intent information comprises network policy information, and the method further comprises:
executing, by the first network device according to the intent information, a network policy corresponding to the network policy information.

10. The method according to claim 1, wherein the match condition information comprises at least two types of device information, the packet further comprises an indication flag, the indication flag is used to instruct the first network device to select device information between which and the device information of the second network device matching is to be performed, and the selected device information is device performance information.

11. The method according to claim 1, wherein the packet further comprises a first group of match information and a second group of match information, the first group of match information and the second group of match information each comprise match object information and match condition information, and correspondingly, the packet further comprises a match indication flag, wherein the match indication flag is used to instruct the first network device to use the first group of match information and the second group of match information, or the match indication flag is used to instruct to:
when match condition information in at least two groups of match information is matched, select a processing manner corresponding to the matched match condition information to process the packet.

12. A first network device, comprising: a memory, a processor, and a network interface, wherein the memory, the processor, and the network interface are connected to each other by using a bus, the memory is configured to store a group of program instructions, and the processor is configured to invoke the program instruction stored in the memory to perform the following operations:
triggering the network interface to receive a packet, wherein the packet comprises match object information and match condition information;
determining a to-be-matched second network device among one or more network devices according to the match object information, and matching device information of the second network device with the match condition information, wherein the device information of the second network device matches device performance information of the first network device and the device performance information is either information about a forwarding capability or a capacity capability of a network device; and
performing forwarding processing or discarding processing on the packet according to a match result of matching the device information of the second network device with the match condition information.

13. The first network device according to claim 12, wherein the to-be-matched second network device determined by the processor is a neighboring device of the first network device, configuring the processor to match the device information of the second network device with the match condition information further comprises:
match device information of the neighboring device of the first network device with the match condition information.

14. The first network device according to claim 13, wherein configuring the processor to perform the forwarding processing on the packet according to the match result further comprises:
when it is determined that a neighboring device that is of the first network device and that matches the match condition information exists, forward the packet to the neighboring device that is of the first network device and that matches the match condition information.

15. The first network device according to claim 14, wherein configuring the processor to perform the discarding processing on the packet according to the match result further comprises:
when it is determined that the device information of the first network device does not match the match condition information, perform the discarding processing on the packet.

16. The first network device according to claim 13, wherein configuring the processor to perform the discarding processing on the packet according to the match result of matching the device information of the second network device with the match condition information further comprises:
when it is determined that no neighboring device that is of the first network device and that matches the match condition information exists, perform the discarding processing on the packet.

17. The first network device according to claim 12, wherein the second network device determined by the processor is the first network device, and configuring the processor to match the device information of the second network device with the match condition information further comprises:
match device information of the first network device with the match condition information.

18. The first network device according to claim 17, wherein configuring the processor to perform the forwarding processing on the packet according to the match result further comprises:
when it is determined that the device information of the first network device matches the match condition information, forward the packet to at least one neighboring device of the first network device.

* * * * *